(12) United States Patent
Kumar

(10) Patent No.: US 9,571,420 B2
(45) Date of Patent: *Feb. 14, 2017

(54) INTEGRATED NOC FOR PERFORMING DATA COMMUNICATION AND NOC FUNCTIONS

(71) Applicant: NETSPEED SYSTEMS, San Jose, CA (US)

(72) Inventor: Sailesh Kumar, San Jose, CA (US)

(73) Assignee: NetSpeed Systems, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/014,955

(22) Filed: Feb. 3, 2016

(65) Prior Publication Data

US 2016/0156572 A1    Jun. 2, 2016

Related U.S. Application Data

(63) Continuation of application No. 14/245,917, filed on Apr. 4, 2014, now Pat. No. 9,319,232.

(51) Int. Cl.
*G06F 15/78* (2006.01)
*H04L 12/933* (2013.01)
(Continued)

(52) U.S. Cl.
CPC ......... *H04L 49/15* (2013.01); *G06F 15/7825* (2013.01); *H04L 12/28* (2013.01); *H04L 12/6418* (2013.01); *H04L 49/604* (2013.01)

(58) Field of Classification Search
CPC ...... G06F 15/7825; H04L 49/15; H04L 12/28; H04L 49/109
See application file for complete search history.

(56) References Cited

U.S. PATENT DOCUMENTS 5,432,785 A    7/1995   Ahmed et al.
5,764,741 A    6/1998   Barak
(Continued)

FOREIGN PATENT DOCUMENTS

CN    103684961 A    3/2014
WO    2014059024 A1  4/2014

OTHER PUBLICATIONS

Abts, D., et al., Age-Based Packet Arbitration in Large-Radix k-ary n-cubes, Supercomputing 2007 (SC07), Nov. 10-16, 2007, 11 pgs.

(Continued)

*Primary Examiner* — Hoon J Chung
(74) *Attorney, Agent, or Firm* — Procopio, Cory, Hargreaves & Savitch LLP

(57) ABSTRACT

The present disclosure is directed to a NoC interconnect that consolidates one or more Network on Chip functions into one Network on Chip. The present disclosure is further directed to a Network on Chip (NoC) interconnect comprising a plurality of first agents, wherein each agent can be configured to communicate with other ones of the plurality of first agents. NoC of the present disclosure can further include a second agent configured to perform a NoC function, and a bridge associated with the second agent, wherein the bridge can be configured to packetize messages from the second agent to the plurality of first agents, and to translate messages from the plurality of first agents to the second agent.

9 Claims, 15 Drawing Sheets

(51) Int. Cl.
*H04L 12/28* (2006.01)
*H04L 12/931* (2013.01)
*H04L 12/64* (2006.01)

(56) References Cited

U.S. PATENT DOCUMENTS

| | | |
|---|---|---|
| 5,991,308 A | 11/1999 | Fuhrmann et al. |
| 6,003,029 A | 12/1999 | Agrawal et al. |
| 6,249,902 B1 | 6/2001 | Igusa et al. |
| 6,415,282 B1 | 7/2002 | Mukherjea et al. |
| 6,925,627 B1 | 8/2005 | Longway et al. |
| 7,065,730 B2 | 6/2006 | Alpert et al. |
| 7,318,214 B1 | 1/2008 | Prasad et al. |
| 7,590,959 B2 | 9/2009 | Tanaka |
| 7,725,859 B1 | 5/2010 | Lenahan et al. |
| 7,808,968 B1 | 10/2010 | Kalmanek, Jr. et al. |
| 7,917,885 B2 | 3/2011 | Becker |
| 8,050,256 B1 | 11/2011 | Bao et al. |
| 8,059,551 B2 | 11/2011 | Milliken |
| 8,099,757 B2 | 1/2012 | Riedl et al. |
| 8,136,071 B2 | 3/2012 | Solomon |
| 8,281,297 B2 | 10/2012 | Dasu et al. |
| 8,312,402 B1 | 11/2012 | Okhmatovski et al. |
| 8,448,102 B2 | 5/2013 | Kornachuk et al. |
| 8,492,886 B2 | 7/2013 | Or-Bach et al. |
| 8,541,819 B1 | 9/2013 | Or-Bach et al. |
| 8,543,964 B2 | 9/2013 | Ge et al. |
| 8,601,423 B1 | 12/2013 | Philip et al. |
| 8,635,577 B2 | 1/2014 | Kazda et al. |
| 8,667,439 B1 | 3/2014 | Kumar et al. |
| 8,717,875 B2 | 5/2014 | Bejerano et al. |
| 9,319,232 B2 * | 4/2016 | Kumar ................ H04L 12/28 |
| 2002/0071392 A1 | 6/2002 | Grover et al. |
| 2002/0073380 A1 | 6/2002 | Cooke et al. |
| 2002/0095430 A1 | 7/2002 | Egilsson et al. |
| 2004/0216072 A1 | 10/2004 | Alpert et al. |
| 2005/0147081 A1 | 7/2005 | Acharya et al. |
| 2006/0161875 A1 | 7/2006 | Rhee |
| 2007/0118320 A1 | 5/2007 | Luo et al. |
| 2007/0244676 A1 | 10/2007 | Shang et al. |
| 2007/0256044 A1 | 11/2007 | Coryer et al. |
| 2007/0267680 A1 | 11/2007 | Uchino et al. |
| 2008/0072182 A1 | 3/2008 | He et al. |
| 2008/0120129 A1 | 5/2008 | Seubert et al. |
| 2008/0140903 A1 | 6/2008 | Chou et al. |
| 2009/0070726 A1 | 3/2009 | Mehrotra et al. |
| 2009/0268677 A1 | 10/2009 | Chou et al. |
| 2009/0313592 A1 | 12/2009 | Murali et al. |
| 2010/0040162 A1 | 2/2010 | Suehiro |
| 2011/0035523 A1 | 2/2011 | Feero et al. |
| 2011/0060831 A1 | 3/2011 | Ishii et al. |
| 2011/0072407 A1 | 3/2011 | Keinert et al. |
| 2011/0154282 A1 | 6/2011 | Chang et al. |
| 2011/0276937 A1 | 11/2011 | Waller |
| 2012/0022841 A1 | 1/2012 | Appleyard |
| 2012/0023473 A1 | 1/2012 | Brown et al. |
| 2012/0026917 A1 | 2/2012 | Guo et al. |
| 2012/0110541 A1 | 5/2012 | Ge et al. |
| 2012/0155250 A1 | 6/2012 | Carney et al. |
| 2013/0051397 A1 | 2/2013 | Guo et al. |
| 2013/0080073 A1 | 3/2013 | de Corral |
| 2013/0083798 A1 | 4/2013 | Lakshmanamurthy et al. |
| 2013/0086398 A1 | 4/2013 | Khor et al. |
| 2013/0103369 A1 | 4/2013 | Huynh et al. |
| 2013/0151215 A1 | 6/2013 | Mustapha |
| 2013/0159944 A1 | 6/2013 | Uno et al. |
| 2013/0174113 A1 | 7/2013 | Lecler et al. |
| 2013/0207801 A1 | 8/2013 | Barnes |
| 2013/0219148 A1 | 8/2013 | Chen et al. |
| 2013/0263068 A1 | 10/2013 | Cho et al. |
| 2013/0326458 A1 | 12/2013 | Kazda et al. |
| 2014/0068132 A1 | 3/2014 | Philip et al. |
| 2014/0092740 A1 | 4/2014 | Wang et al. |
| 2014/0098683 A1 | 4/2014 | Kumar et al. |
| 2014/0115218 A1 | 4/2014 | Philip et al. |
| 2014/0115298 A1 | 4/2014 | Philip et al. |

OTHER PUBLICATIONS

Das, R., et al., Aergia: Exploiting Packet Latency Slack in On-Chip Networks, 37th International Symposium on Computer Architecture (ISCA '10), Jun. 19-23, 2010, 11 pgs.

Ebrahimi, E., et al., Fairness via Source Throttling: A Configurable and High-Performance Fairness Substrate for Multi-Core Memory Systems, ASPLOS '10, Mar. 13-17, 2010, 12 pgs.

Grot, B., Preemptive Virtual Clock: A Flexible, Efficient, and Cost-Effective QOS Scheme for Networks-on-Chip, Micro '09, Dec. 12-16, 2009, 12 pgs.

Grot, B., Kilo-Noc: A Heterogeneous Network-on-Chip Architecture for Scalability and Service Guarantees, ISCA 11, Jun. 4-8, 2011, 12 pgs.

Grot B., Topology-Aware Quality-of-Service Support in Highly Integrated Chip Multiprocessors, 6th Annual Workshop on the Interaction between Operating Systems and Computer Architecture, Jun. 2006, 11 pgs.

Jiang, N., et al., Performance Implications of Age-Based Allocations in On-Chip Networks, CVA MEMO 129, May 24, 2011, 21 pgs.

Lee, J. W., et al., Globally-Synchronized Frames for Guaranteed Quality-of-Service in On-Chip Networks, 35th IEEE/ACM International Symposium on Computer Architecture (ISCA), Jun. 2008, 12 pgs.

Lee, M. M., et al., Approximating Age-Based Arbitration in On-Chip Networks, PACT '10, Sep. 11-15, 2010, 2 pgs.

Li, B. et al., CoQoS: Coordinating QoS-Aware Shared Resources in NoC-based SoCs, J. Parallel Distrib. Comput., 71 (5), May 2011, 14 pgs.

International Search Report and Written Opinion for PCT/US2013/064140, Jan. 22, 2014, 9 pgs.

International Search Report and Written Opinion for PCT/US2014/012003, Mar. 26, 2014, 9 pgs.

International Search Report and Written Opinion for PCT/US2014/012012, May 14, 2014, 9 pgs.

Ababei, C., et al., Achieving Network on Chip Fault Tolerance by Adaptive Remapping, Parallel & Distributed Processing, 2009, IEEE International Symposium, 4 pgs.

Beretta, I, et al., A Mapping Flow for Dynamically Reconfigurable Multi-Core System-on-Chip Design, IEEE Transactions on Computer-Aided Design of Integrated Circuits and Systems, Aug. 2011, 30(8), pp. 1211-1224.

Gindin, R., et al., NoC-Based FPGA: Architecture and Routing, Proceedings of the First International Symposium on Networks-on-Chip (NOCS'07), May 2007, pp. 253-262.

Yang, J., et al., Homogeneous NoC-based FPGA: The Foundation for Virtual FPGA, 10th IEEE International conference on Computer and Information Technology (CIT 2010), Jun. 2010, pp. 62-67.

Hansson et al., Trade-Offs in the Configuration of a Network on Chip for Multiple Use-Cases, Proceedings of the International Symposium on Networks-on-Chip (NOCS'07), 2007, 10 pages.

* cited by examiner

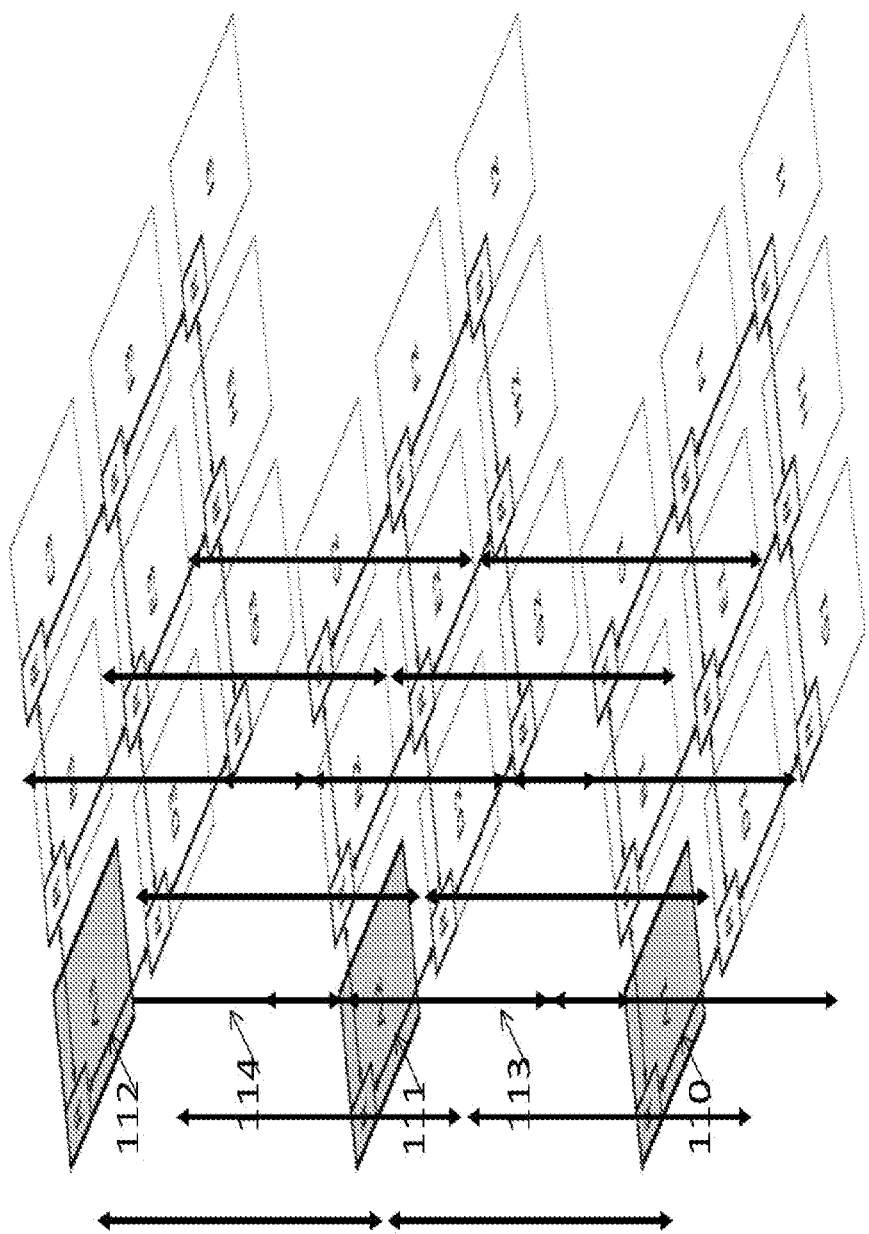

INTEGRATED NOC FOR PERFORMING DATA COMMUNICATION AND NOC FUNCTIONS

This application is a Continuation of U.S. Pat. No. 9,319,232, issued Apr. 19, 2016, (U.S. patent application Ser. No. 14/245,917, filed on Apr. 4, 2014), the contents of which is incorporated herein by reference in its entirety.

BACKGROUND

Technical Field

Methods and example implementations described herein are directed to Network on Chip (NoC) interconnect architecture, and more specifically, to a NoC interconnect that consolidates one or more Network on Chip functions into one Network on Chip.

Related Art

The number of components on a chip is rapidly growing due to increasing levels of integration, system complexity and shrinking transistor geometry. Complex System-on-Chips (SoCs) may involve a variety of components e.g., processor cores, DSPs, hardware accelerators, memory and I/O, while Chip Multi-Processors (CMPs) may involve a large number of homogenous processor cores, memory and I/O subsystems. In both SoC and CMP systems, the on-chip interconnect plays a role in providing high-performance communication between the various components. Due to scalability limitations of traditional buses and crossbar based interconnects, Network-on-Chip (NoC) has emerged as a paradigm to interconnect a large number of components on the chip. NoC is a global shared communication infrastructure made up of several routing nodes interconnected with each other using point-to-point physical links.

Messages are injected by the source and are routed from the source node to the destination over multiple intermediate nodes and physical links. The destination node then ejects the message and provides the message to the destination. For the remainder of this application, the terms 'components', 'blocks', 'hosts' or 'cores' will be used interchangeably to refer to the various system components which are interconnected using a NoC. Terms 'routers' and 'nodes' will also be used interchangeably. Without loss of generalization, the system with multiple interconnected components will itself be referred to as a 'multi-core system'.

There are several topologies in which the routers can connect to one another to create the system network. Bi-directional rings (as shown in FIG. 1(a)), 2-D (two dimensional) mesh (as shown in FIG. 1(b)) and 2-D Torus (as shown in FIG. 1(c)) are examples of topologies in the related art. Mesh and Torus can also be extended to 2.5-D (two and half dimensional) or 3-D (three dimensional) organizations. FIG. 1(d) shows a 3D mesh NoC, where there are three layers of 3×3 2D mesh NoC, shown over each other. The NoC routers have up to two additional ports, one connecting to a router in the higher layer, and another connecting to a router in the lower layer. Router 111 in the middle layer of the example has both of its ports used, one connecting to the router at the top layer and another connecting to the router at the bottom layer. Routers 110 and 112 are at the bottom and top mesh layers respectively, therefore they have only the upper facing port 113 and the lower facing port 114 respectively connected.

Packets are message transport units for intercommunication between various components. Routing involves identifying a path composed of a set of routers and physical links of the network over which packets are sent from a source to a destination. Components are connected to one or multiple ports of one or multiple routers; with each such port having a unique ID. Packets carry the destination's router and port ID for use by the intermediate routers to route the packet to the destination component.

Examples of routing techniques include deterministic routing, which involves choosing the same path from A to B for every packet. This form of routing is independent from the state of the network and does not load balance across path diversities, which might exist in the underlying network. However, such deterministic routing that may be implemented in hardware, maintains packet ordering and may be rendered free of network level deadlocks. Shortest path routing may minimize the latency as such routing reduces the number of hops from the source to the destination. For this reason, the shortest path may also be the lowest power path for communication between the two components. Dimension-order routing is a form of deterministic shortest path routing in 2-D, 2.5-D, and 3-D mesh networks. In this routing scheme, messages are routed along each coordinates in a particular sequence until the message reaches the final destination. For example in a 3-D mesh network, one may first route along the X dimension until it reaches a router whose X-coordinate is equal to the X-coordinate of the destination router. Next, the message takes a turn and is routed in along Y dimension and finally takes another turn and moves along the Z dimension until the message reaches the final destination router. Dimension ordered routing may be minimal turn and shortest path routing.

FIG. 2(a) pictorially illustrates an example of XY routing in a two dimensional mesh. More specifically, FIG. 2(a) illustrates XY routing from node '34' to node '00'. In the example of FIG. 2(a), each component is connected to only one port of one router. A packet is first routed over the x-axis till the packet reaches node '04' where the x-coordinate of the node is the same as the x-coordinate of the destination node. The packet is next routed over the y-axis until the packet reaches the destination node.

In heterogeneous mesh topology in which one or more routers or one or more links are absent, dimension order routing may not be feasible between certain source and destination nodes, and alternative paths may have to be taken. The alternative paths may not be shortest or minimum turn.

Source routing and routing using tables are other routing options used in NoC. Adaptive routing can dynamically change the path taken between two points on the network based on the state of the network. This form of routing may be complex to analyze and implement.

A NoC interconnect may contain multiple physical networks. Over each physical network, there may exist multiple virtual networks, wherein different message types are transmitted over different virtual networks. In this case, at each physical link or channel, there are multiple virtual channels; each virtual channel may have dedicated buffers at both end points. In any given clock cycle, only one virtual channel can transmit data on the physical channel.

NoC interconnects may employ wormhole routing, wherein, a large message or packet is broken into small pieces known as flits (also referred to as flow control digits). The first flit is the header flit, which holds information about this packet's route and key message level info along with payload data and sets up the routing behavior for all subsequent flits associated with the message. Optionally, one or more body flits follows the head flit, containing the remaining payload of data. The final flit is the tail flit, which in addition to containing the last payload also performs some bookkeeping to close the connection for the message. In wormhole flow control, virtual channels are often implemented.

The physical channels are time sliced into a number of independent logical channels called virtual channels (VCs). VCs provide multiple independent paths to route packets, however they are time-multiplexed on the physical channels. A virtual channel holds the state needed to coordinate the handling of the flits of a packet over a channel. At a minimum, this state identifies the output channel of the current node for the next hop of the route and the state of the virtual channel (idle, waiting for resources, or active). The virtual channel may also include pointers to the flits of the packet that are buffered on the current node and the number of flit buffers available on the next node.

The term "wormhole" plays on the way messages are transmitted over the channels: the output port at the next router can be so short that the received data can be translated in the head flit before the full message arrives. This allows the router to quickly set up the route upon arrival of the head flit and then opt out from the rest of the conversation. Since a message is transmitted flit by flit, the message may occupy several flit buffers along its path at different routers, creating a worm-like image.

Based upon the traffic between various end points, and the routes and physical networks that are used for various messages, different physical channels of the NoC interconnect may experience different levels of load and congestion. The capacity of various physical channels of a NoC interconnect is determined by the width of the channel (number of physical wires) and the clock frequency at which it is operating. Various channels of the NoC may operate at different clock frequencies, and various channels may have different widths based on the bandwidth requirement at the channel. The bandwidth requirement at a channel is determined by the flows that traverse over the channel and their bandwidth values. Flows traversing over various NoC channels are affected by the routes taken by various flows. In a mesh or Torus NoC, there may exist multiple route paths of equal length or number of hops between any pair of source and destination nodes. For example, in FIG. 2(b), in addition to the standard XY route between nodes 34 and 00, there are additional routes available, such as YX route 203 or a multi-turn route 202 that makes more than one turn from source to destination.

In a NoC with statically allocated routes for various traffic slows, the load at various channels may be controlled by intelligently selecting the routes for various flows. When a large number of traffic flows and substantial path diversity is present, routes can be chosen such that the load on all NoC channels is balanced nearly uniformly, thus avoiding a single point of bottleneck. Once routed, the NoC channel widths can be determined based on the bandwidth demands of flows on the channels. Unfortunately, channel widths cannot be arbitrarily large due to physical hardware design restrictions, such as timing or wiring congestion. There may be a limit on the maximum channel width, thereby putting a limit on the maximum bandwidth of any single NoC channel.

Additionally, wider physical channels may not help in achieving higher bandwidth if messages are short. For example, if a packet is a single flit packet with a 64-bit width, then no matter how wide a channel is, the channel will only be able to carry 64 bits per cycle of data if all packets over the channel are similar. Thus, a channel width is also limited by the message size in the NoC. Due to these limitations on the maximum NoC channel width, a channel may not have enough bandwidth in spite of balancing the routes.

To address the above bandwidth concern, multiple parallel physical NoCs may be used. Each NoC may be called a layer, thus creating a multi-layer NoC architecture. Hosts inject a message on a NoC layer, wherein the message is then routed to the destination on the NoC layer. Thus, each layer operates more or less independently from each other, and interactions between layers may only occur during the injection and ejection times. FIG. 3(a) illustrates a two layer NoC. Here the two NoC layers are shown adjacent to each other on the left and right, with the hosts connected to the NoC replicated in both left and right diagrams. A host is connected to two routers of different layers. For example, a router connected to host in the first layer is shown as R1, and a router connected to host in the second layer is shown as R2. In this example, the multi-layer NoC is different from the 3D NoC. In this case, multiple layers are on a single silicon die and are used to meet the high bandwidth demands of the communication between hosts on the same silicon die. Messages do not go from one layer to another. For purposes of clarity, the present application will utilize such a horizontal left and right illustration for multi-layer NoC to differentiate from the 3D NoCs, which are illustrated by drawing the NoCs vertically over each other.

In FIG. 3(b), a host connected to a router from each layer, R1 and R2 respectively, is illustrated. Each router is connected to other routers in its layer using directional ports 301, and is connected to the host using injection and ejection ports 302. A bridge-logic 303 may sit between the host and the two NoC layers to determine the NoC layer for an outgoing message and sends the message from host to the NoC layer, and also perform the arbitration and multiplexing between incoming messages from the two NoC layers and delivers them to the host.

In a multi-layer NoC, the number of layers needed may depend upon a number of factors such as the aggregate bandwidth requirement of all traffic flows in the system, the routes that are used by various flows, message size distribution, maximum channel width, etc. Once the number of NoC layers in NoC interconnect is determined in a design, different type of messages and traffic flows may be routed over different NoC layers. Additionally, one may design NoC interconnects in such a way that different layers have different topologies in number of routers, channels and connectivity. The channels in different layers may have different widths based on the flows that traverse over the channel and their bandwidth requirements.

In the related art, there can be dedicated NoCs for facilitating one or more NoC functions. These functions can include configuration/register access, monitoring, debugging, Joint Test Action Group (JTAG), and interrupt/exception handling. In such systems, multiple NoCs are employed within a System on Chip (SoC). In this related art implementation, the logical architecture of the NoCs include a separate NoC that is dedicated for regular agent to agent communication, and a separate NoC configured to perform specific NoC functions.

FIG. 4 illustrates an example system involving two NoCs, with one NoC handling agent/host to agent/host communication, and another NoC handling a NoC function. Logical views of the NoCs have been depicted in FIG. 4. In the related art, NoC 400 may include one or more hosts/agents 401, 402, and 403, wherein the NoC 400 is dedicated for handling regular agent to agent communication between different agents 401, 402 and 403. Each agent 401, 402 and 403 can be programmed and configured through a configuration port (register port) through which the agents/hosts are programmed. In the logical picture, they will have one NoC such as NoC 400 where the agents/hosts 401, 402 and 403 are connected to each other. This NoC configuration can be dedicated for regular agent to agent communication and is not otherwise configurable except manually.

To facilitate the NoC functions as described above, related art systems may also employ a separate NoC 410 to perform a defined NoC function that can be any one of the functions including configuration/register access, monitoring, debugging, Joint Test Action Group (JTAG), and interrupt/exception handling functions. In the NoC 410, NoC agents/hosts 411, 412, 413 and 414 do not perform any data communication with each other but rather communicate to perform the desired NoC function. In operation, for instance, one host/agent, such as 414 in the instant example, may be chosen as a master agent for performing the defined NoC function and invoke the function on the agents 411, 412 and 413. Agents 411, 412, and 413 can then propagate the function to the rest of the system. For instance, to facilitate the configuration master function, NoC 410 can be in the form of a configuration/register access network, wherein all of the agents/hosts can be connected and configured to communicate with a configuration master Central Processing Unit (CPU). The configuration master CPU sends messages to agents and receives messages from the agents. The configuration/register access network only contacts with agents for the purpose of propagating instructions from the configuration master out to other elements in the system.

Similarly, separate NoC architectures for facilitating different NoC functions need to be implemented. For instance, a separate Monitor/Debug/JTAG NoC network can be used to snoop the system, wherein the NoC contains a function that monitors and debugs the system. An Interrupt/Exception handler NoC can involve hosts/agents configured to fire an exception or interrupt.

Other custom or proprietary NoCs can be used and built to facilitate the NoC functions. However, these networks are not configurable and are manually designed to address specific problems for a given system. Each NoC function require its own NoC for implementation. This can lead to inefficiencies as the system thereby has less space to accommodate NoCs that handle regular agent to agent communication.

SUMMARY

The present disclosure is directed to a NoC interconnect that consolidates one or more Network on Chip functions into one Network on Chip. The present disclosure is further directed to a Network on Chip (NoC) interconnect comprising a plurality of first agents, wherein each agent can be configured to communicate with other ones of the plurality of first agents. NoC of the present disclosure can further include a second agent configured to perform a NoC function, and a bridge associated with the second agent, wherein the bridge can be configured to packetize messages from the second agent to the plurality of first agents, and to translate messages from the plurality of first agents to the second agent.

Aspects of the present application may include a method, which involves the step of enabling each of a plurality of first agents/hosts to communicate with other ones of the plurality of first agents. The method can further include the step of configuring a second agent to perform a defined NoC function, wherein the NoC function can include, but is not limited to, interrupt/exception handler function, a monitoring function, a debugging function, and a JTAG function. Such a second agent can either be configured at the same NoC level or at a different NoC level in a multi-layer architecture. The method can further include configuring a bridge and associating the bridge with the second agent to packetize messages from the second agent to transmit to the plurality of first agents, and to translate messages from the plurality of first agents to the second agent.

Aspect of present application may include a computer readable storage medium storing instructions for executing a process. The instructions may involve enabling each of a plurality of first agents/hosts to communicate with other ones of the plurality of first agents. The instructions can further involve configuring a second agent to perform a defined NoC function, wherein the NoC function can include, but is not limited to, interrupt/exception handler function, a monitoring function, a debugging function, and a JTAG function. Such a second agent can either be configured at the same NoC level or at a different NoC level in a multi-layer architecture. The instructions can further involve configuring a bridge and associating the bridge with the second agent to packetize messages from the second agent to transmit to the plurality of first agents, and to translate messages from the plurality of first agents to the second agent.

Aspects of the present application may include a system, which involves, a processor that can be configured to execute one or more modules including an agent data communication module, a NoC function performance module, and a bridge association module. In an embodiment, agent data communication module can be configured to enable each of a plurality of first agents/hosts to communicate with other ones of the plurality of first agents. NoC function performance module can be configured to enable a second agent to perform a defined NoC function such as interrupt/exception handler function, a monitoring function, a debugging function, and a JTAG function. Bridge association module can be configured to associate a bridge with the second agent to packetize messages from the second agent to transmit to the plurality of first agents, and to translate messages from the plurality of first agents to the second agent.

BRIEF DESCRIPTION OF THE DRAWINGS

FIGS. 1(a), 1(b) 1(c) and 1(d) illustrate examples of Bidirectional ring, 2D Mesh, 2D Torus, and 3D Mesh NoC Topologies.

DETAILED DESCRIPTION

Figure 1A:
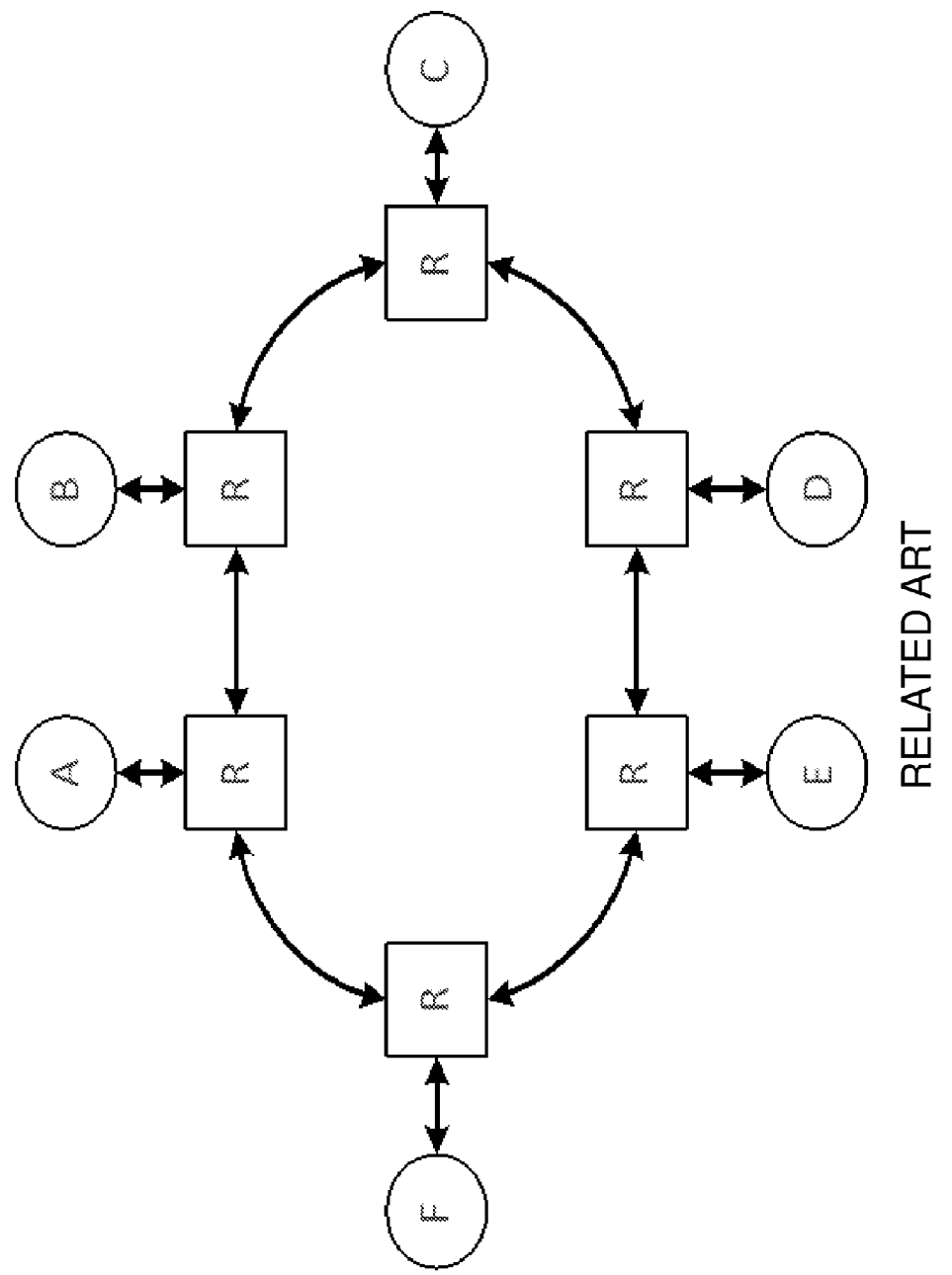
Figure 1B:
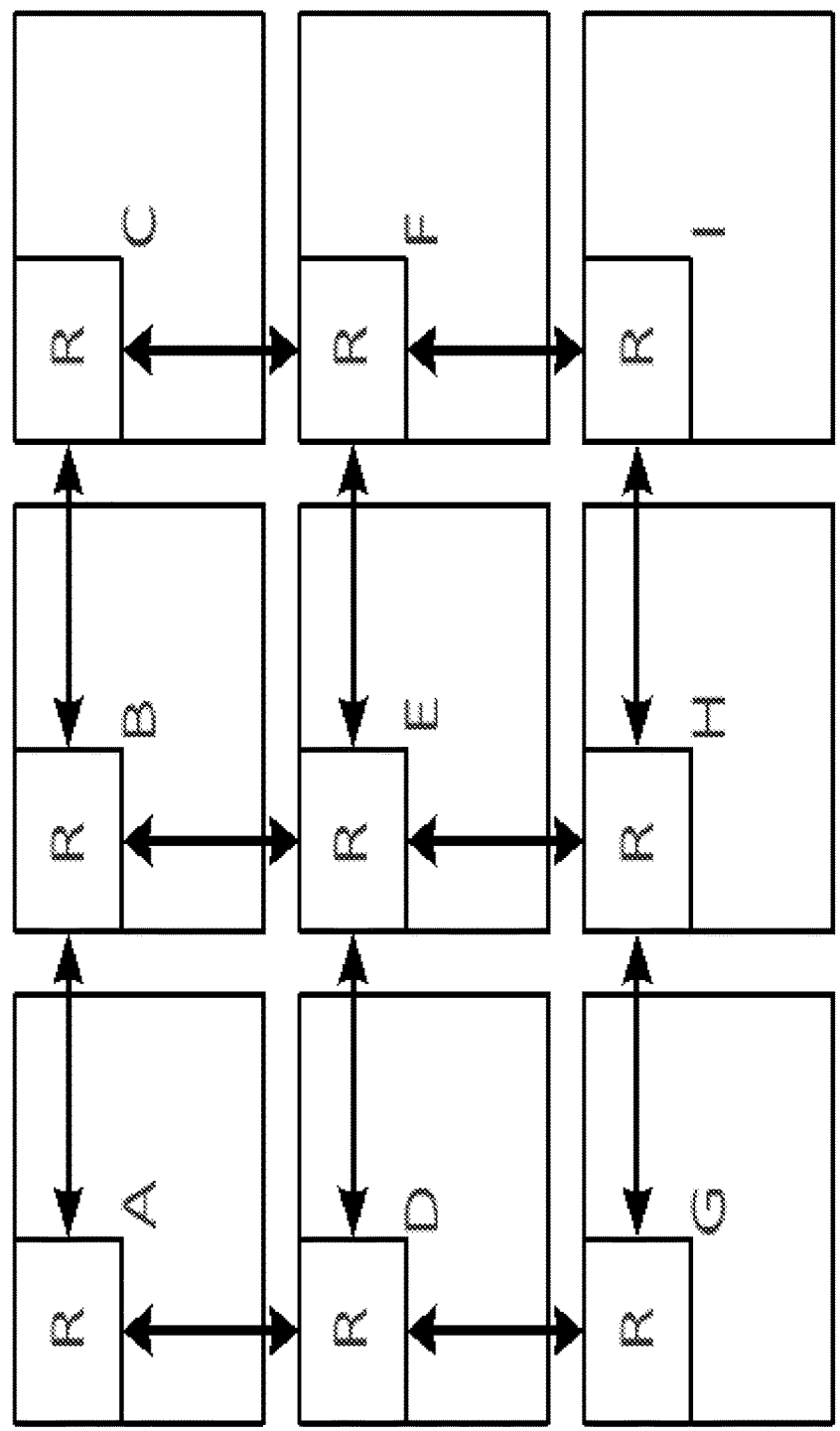
Figure 1C:
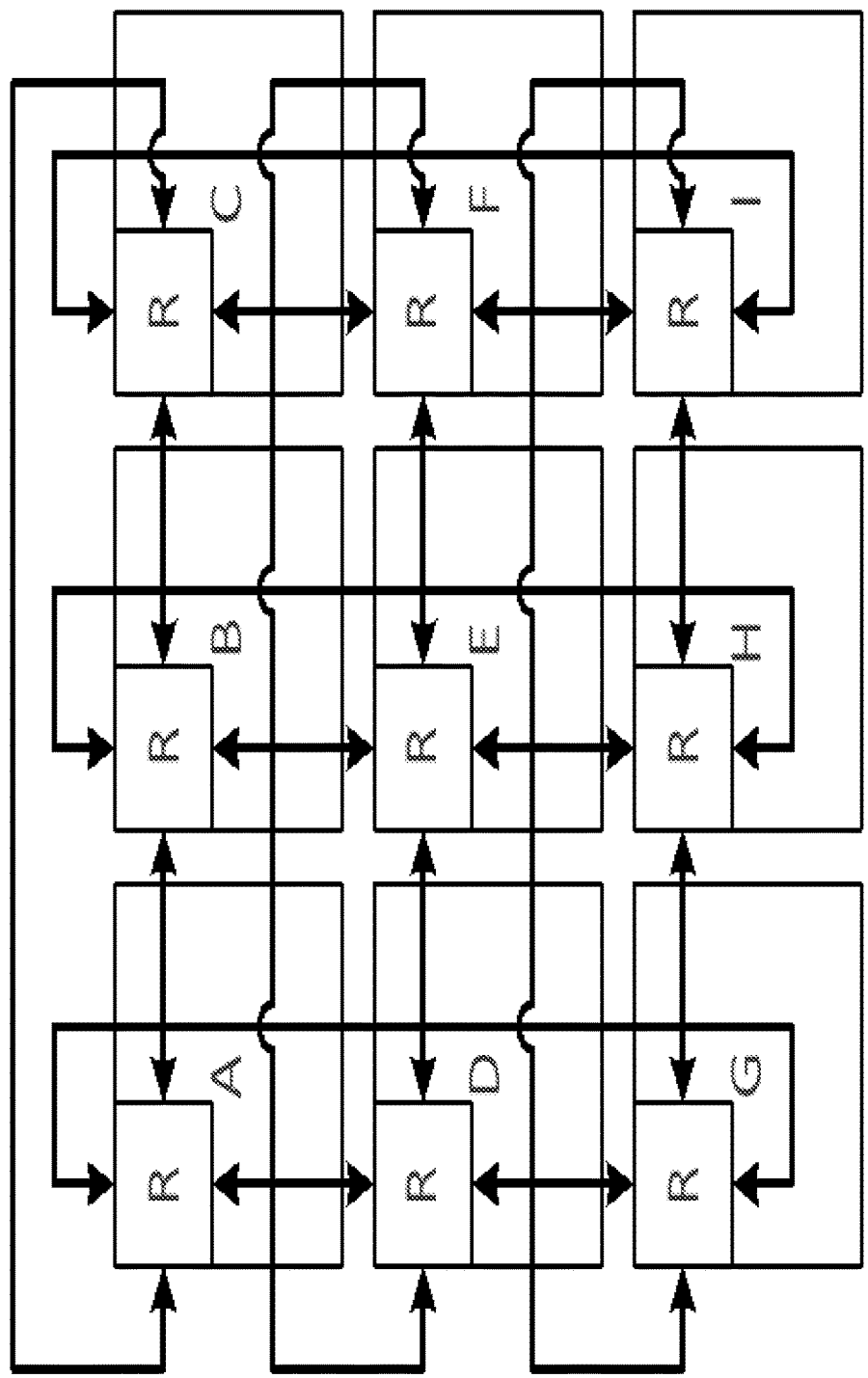
Figure 2A:
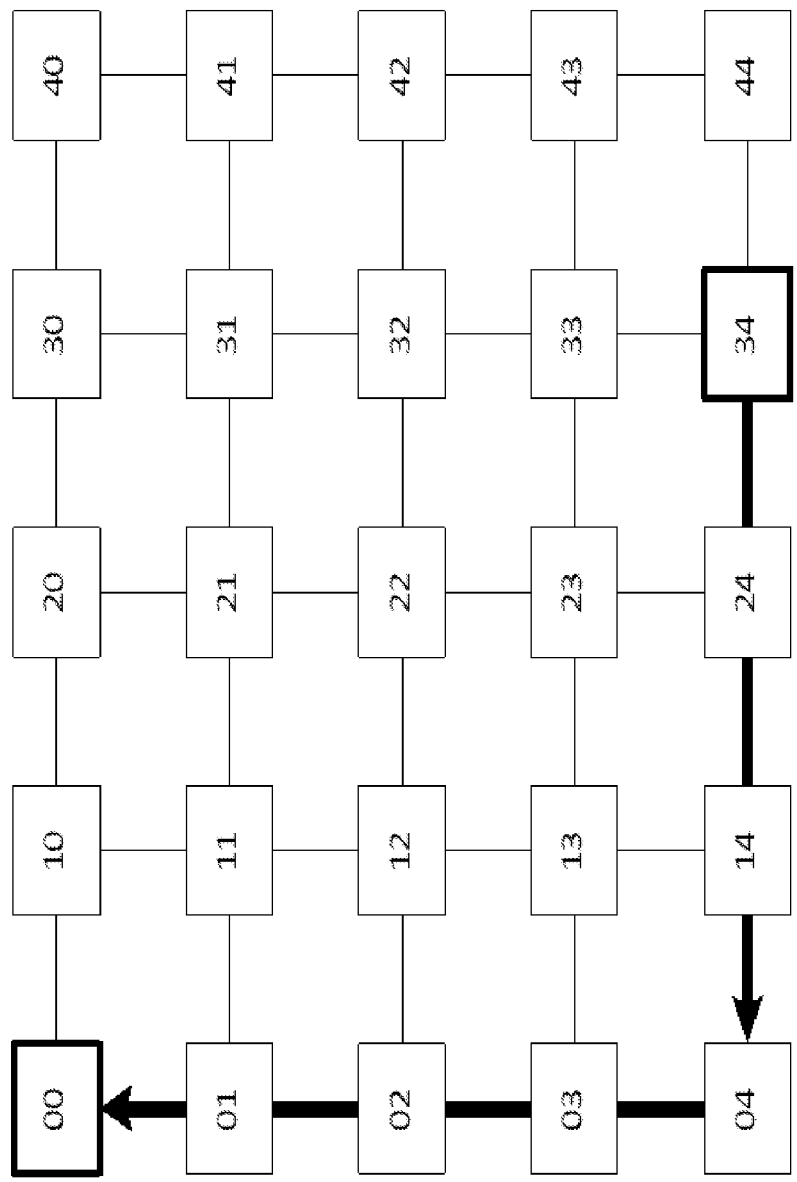
FIG. 2(a) illustrates an example of XY routing in two dimensional mesh in a related art
Figure 2B:
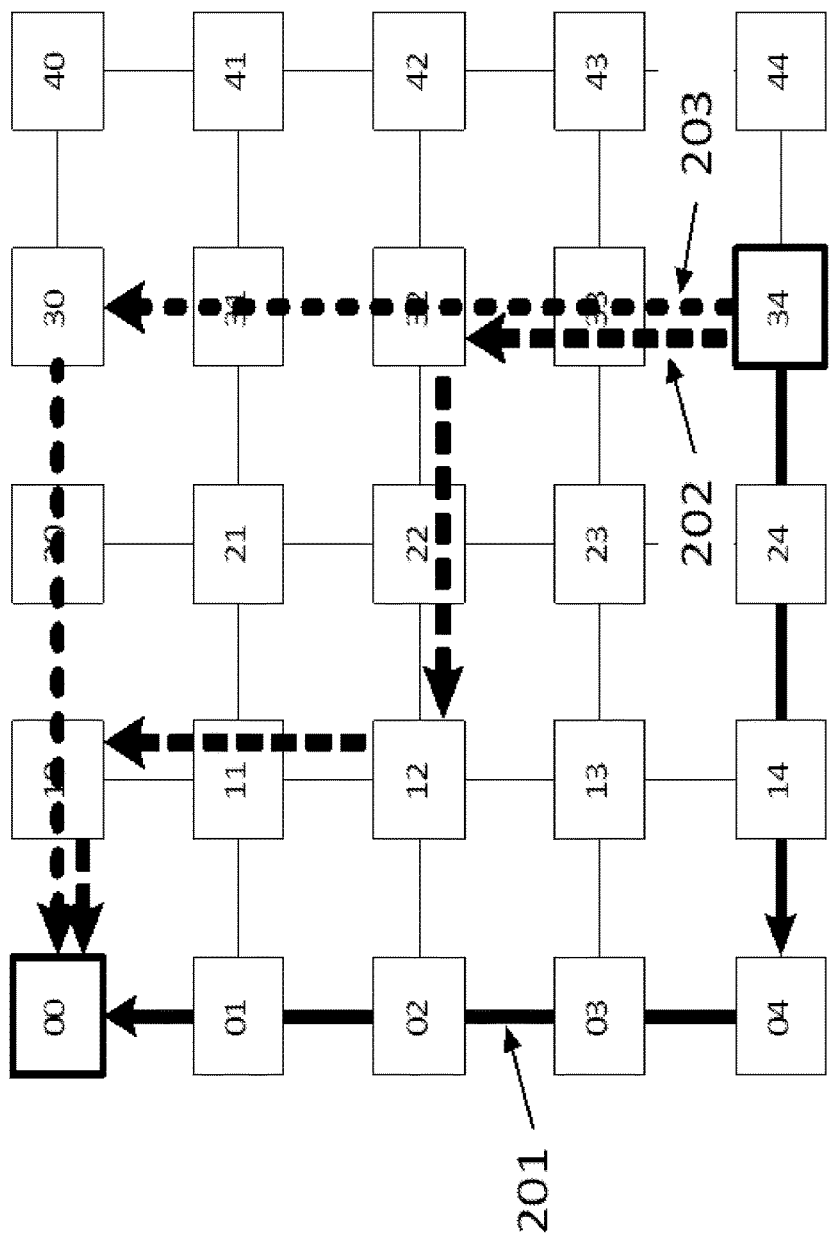
FIG. 2(b) illustrates three different routes between a source and destination nodes.
Figure 3A:
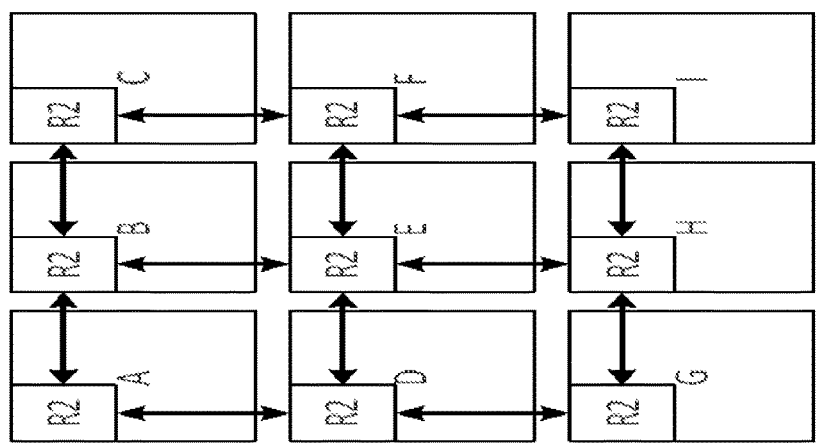
FIG. 3(a) illustrates an example of a related art two layer NoC interconnect.
Figure 3A:
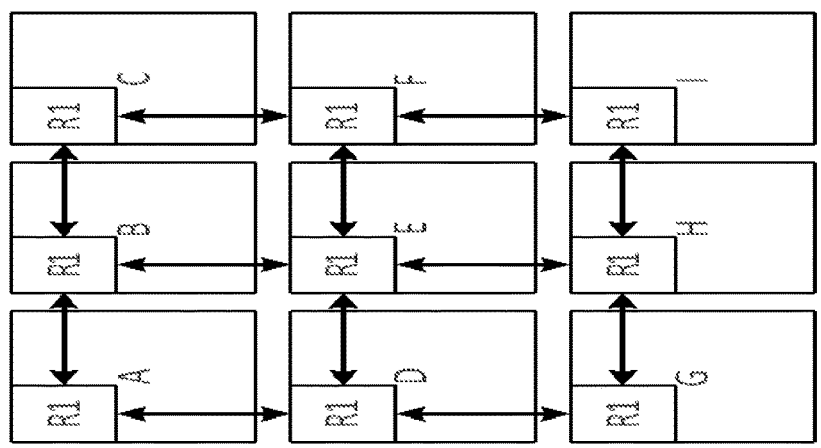
Figure 3B:
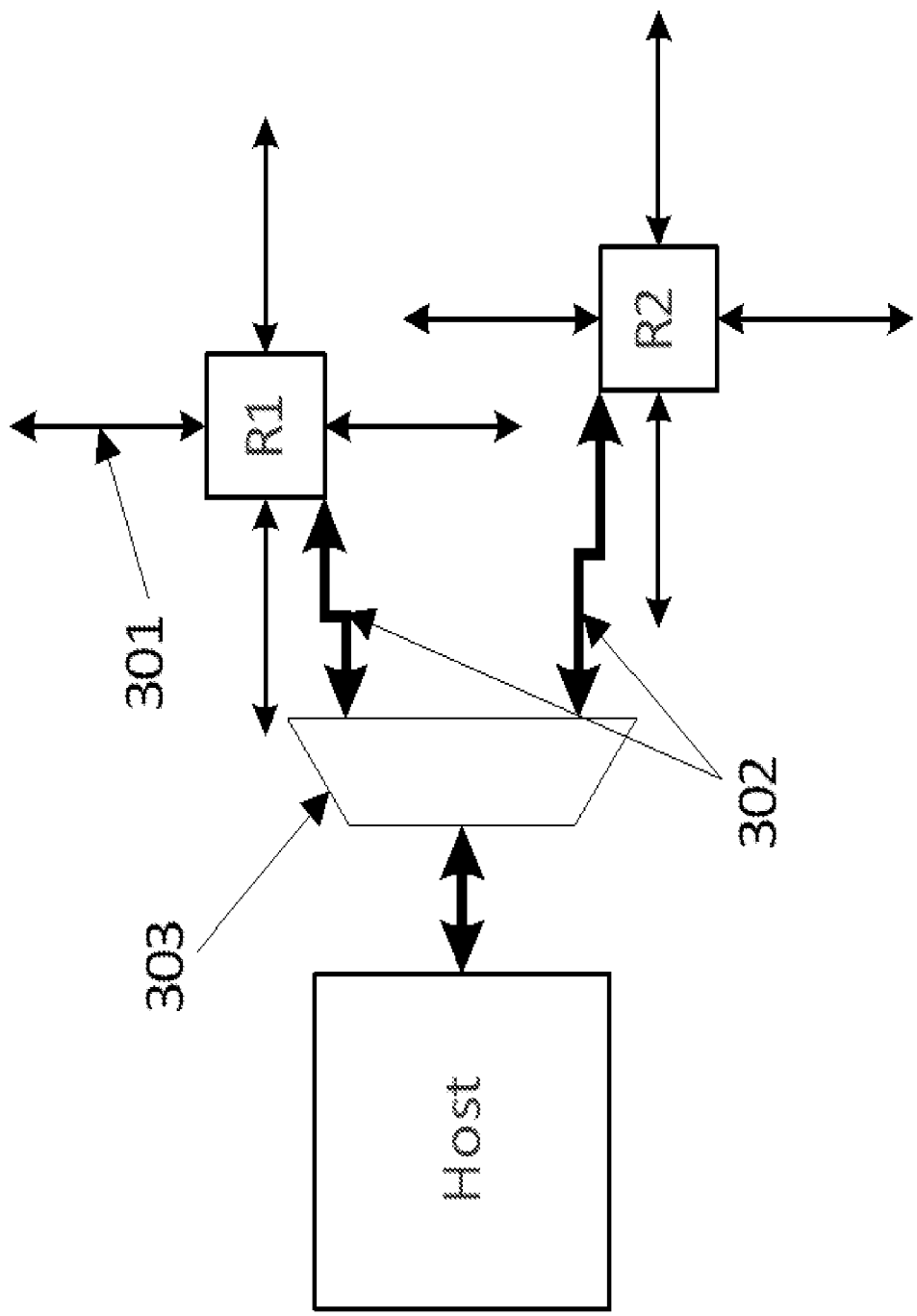
FIG. 3(b) illustrates the related art bridge logic between host and multiple NoC layers.
Figure 4:
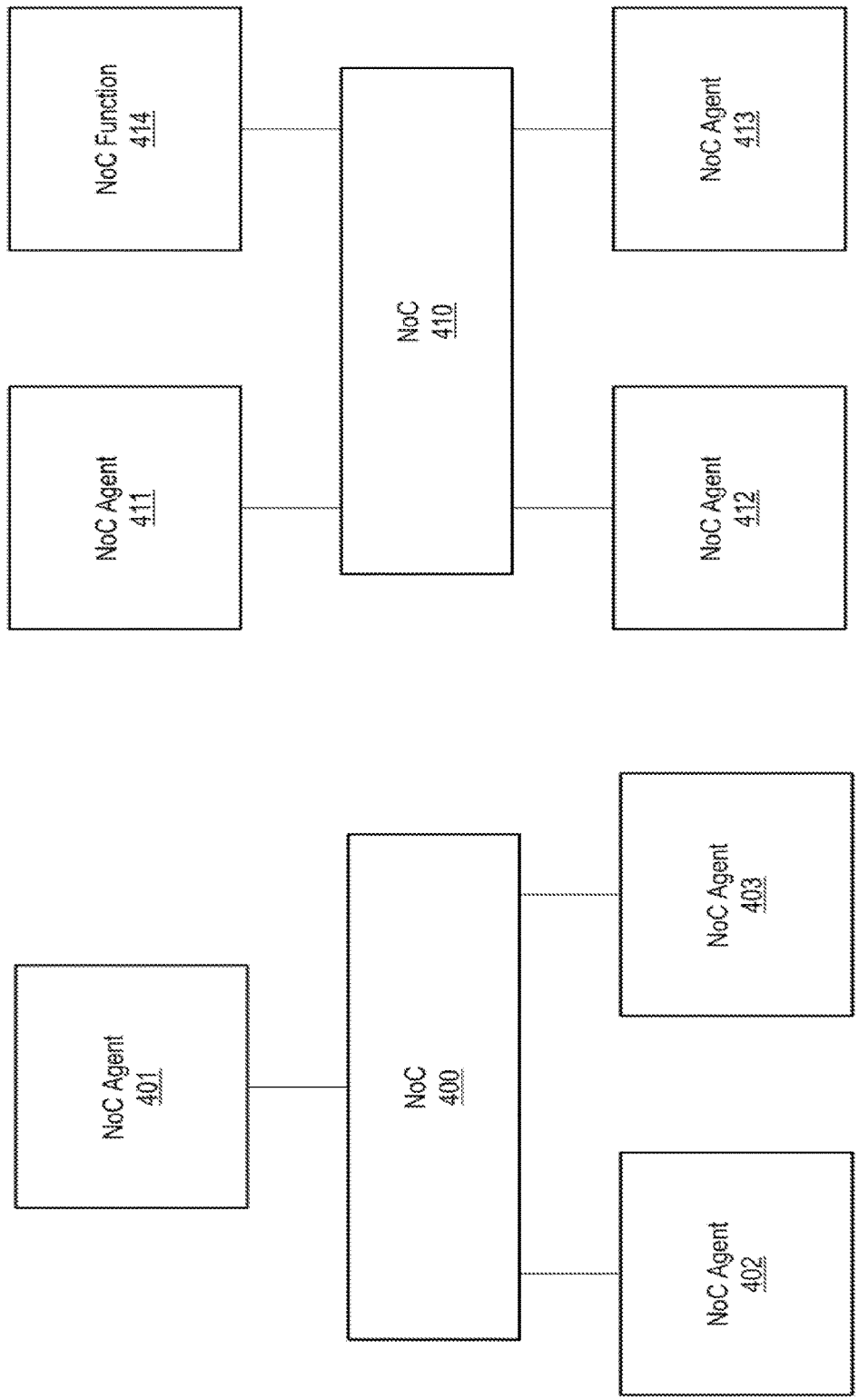
FIG. 4 illustrates an example system involving two NoCs, with one NoC handling agent-to-agent data communication, and the other NoC handling a defined NoC function.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application.

The present disclosure relates to a Network on Chip (NoC) interconnect comprising a plurality of first agents, wherein each agent can be configured to communicate with other ones of the plurality of first agents. NoC of the present disclosure can further include a second agent configured to perform a NoC function, and a bridge associated with the second agent, wherein the bridge can be configured to packetize messages from the second agent to the plurality of first agents, and to translate messages from the plurality of first agents to the second agent.

According to one embodiment, NoC function can be a register access and configuration management function that provides read and write access to one or more configuration registers of the plurality of first agents and to one or more interconnects of the plurality of first agents. In yet another embodiment, the second NoC agent can be associated with an interconnect network comprising at least one separate set of one or more dedicated channels.

In yet another embodiment, the one or more dedicated channels can be isolated from the one or more interconnects of the plurality of first agents, and the one or more dedicated channels can be configured to handle traffic between the second agent and the plurality of first agents. In yet another embodiment, the one or more dedicated channels can be one of a virtual channel and a physical channel. Second agent can be selected as one of the plurality of first agents and can be connected to the one or more interconnects of the plurality of first agents and to an interconnect network dedicated to the second agent. In an aspect of the present disclosure, the NoC function can include, but is not limited to, at least one of an interrupt/exception handler function, a monitoring function, a debugging function and a JTAG function. The second agent can be associated with an interconnect network configured to facilitate traffic for the NoC function that is at least one of the interrupt/exception handling function and a register access and a configuration manager function; the monitoring function; the debugging function; and the JTAG function.

Example implementations of the present disclosure are directed to consolidating the NoC functions into a NoC that also handles the regular agent to agent communication of the system. Systems and methods of the present disclosure relate to a single NoC that can facilitate regular agent-to-agent data communication as well as perform one or more NoC functions. Example implementations of the present disclosure can be implemented within any logical or physical view of the NoC (e.g., 2D mesh, 3D mesh, etc.). The NoC may include a NoC layer that includes routers and bridges to connect agents, also interchangeably referred to as hosts hereinafter, together. In an example implementation, different NoC layers of a NoC interconnect can be used for performance of both agent-to-agent data communication (interchangeably referred to as NoC-Data hereinafter) as well as one or more NoC functions (interchangeably referred to as NoC-Functions hereinafter). In an example implementation, NoC layer-1 can be used for data communication (agent-to-agent communication or NoC-Data), and NoC layer-2 can be used for performance of a first NoC function, and NoC layer-3 can be used for performance of a second NoC function, and so on, enabling different NoC layers to be used for different NoC functions. One should appreciate that a single NoC interconnect can include a plurality of NoC layers and therefore the complete NoC data communication across multiple hosts and performance of one or more NoC functions can be performed within a single NoC interconnect architecture.

Example implementations of the present disclosure consolidate the NoC function by implementing the NoC function as an agent within the NoC. The agent can be configured to implement the NoC function and interact with the NoC via a bridge. In this manner, one NoC can function for both the regular agent to agent communication as well as for chip configuration via the NoC function. Further, multiple NoC functions can be implemented within the same NoC and the implementations can be applied for any NoC configuration.

Figure 5A:
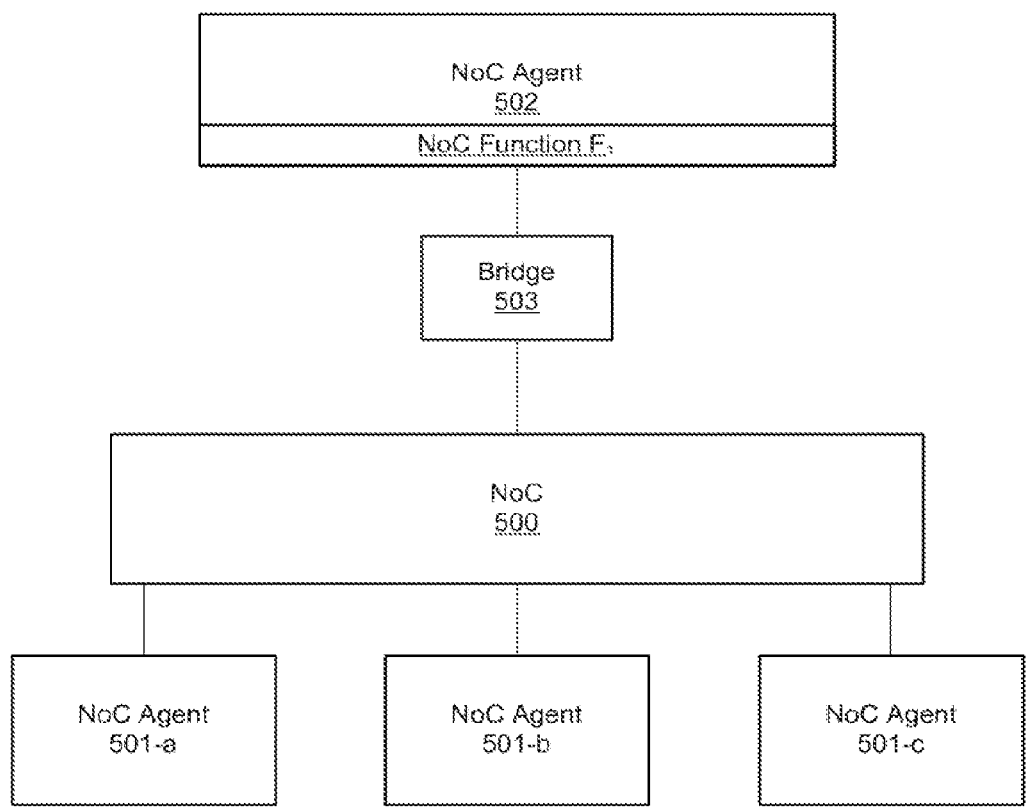
FIGS. 5(a) and 5(b) illustrate logical views of the basic architecture of the consolidated NoC, in accordance with an example implementation.

FIG. 5(a) illustrates a logical view of the basic architecture of the consolidated NoC 500 in accordance with an example implementation. In this example implementation, NoC agents/hosts 501-a, 501-b, and 501-c can be configured to handle regular agent to agent communications, and one agents such as NoC Agent 502 can be configured to perform a first NoC function $F_1$. In order to facilitate communications between NoC agent 502 and the remaining NoC agents 501-a, 502-b and 502-c, a bridge 503 can be used, wherein the bridge can be used to translate messages between protocols associated with function $F_1$ of the NoC agent 502, and protocol(s) of regular NoC agent(s) 501-a, 501-b, and 501-c. One should appreciate that although one agent 502 is illustrated in FIG. 5(a) as being configured to perform a NoC function $F_1$, any number of agents/hosts can be configured in a similar manner for performing other NoC functions within the same NoC. Example implementations of the present disclosure are therefore not limited to the configuration of a single agent in any manner. In an example implementation, any NoC agent can be configured to perform a defined NoC function $F_n$. One and more NoC agents can therefore be configured to perform one and more different NoC functions as well as to support regular data communication between hosts.

Figure 5B:
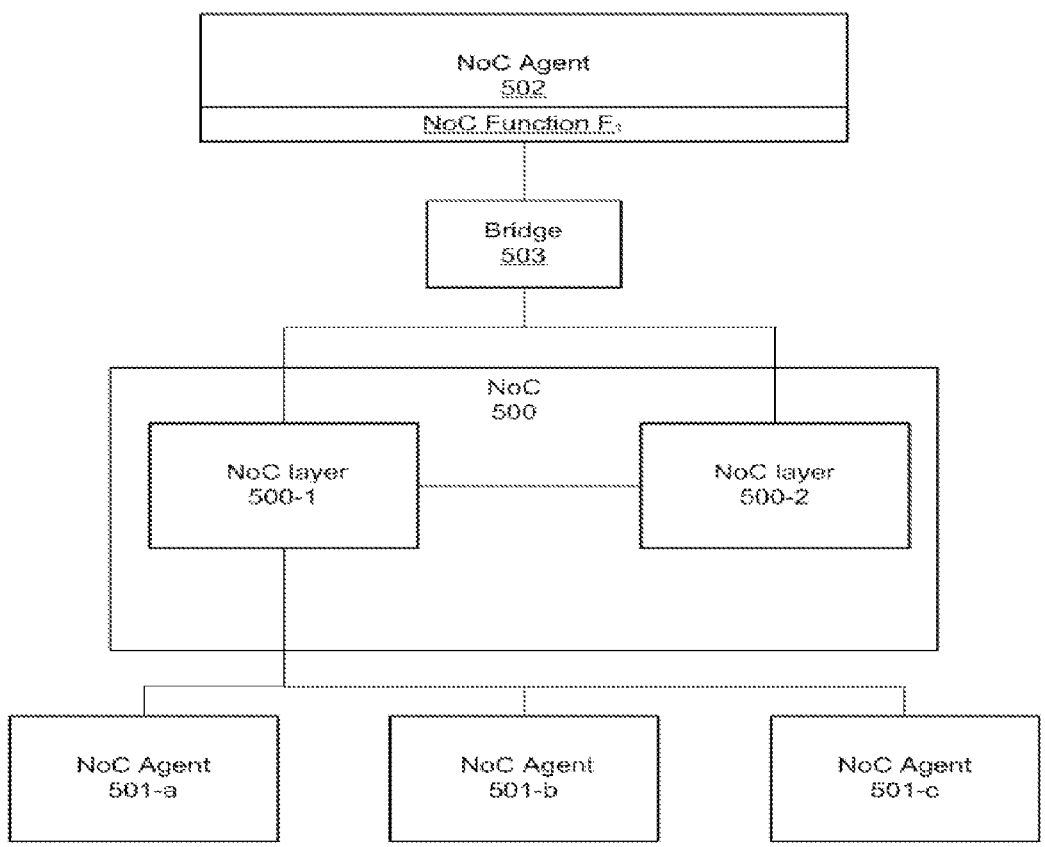

In example implementations, there may be a need to isolate traffic of the NoC function from the regular data traffic of the NoC. FIG. 5(b) illustrates a logical view of an example implementation to isolate traffic of the NoC function $F_1$ by using separate NoC layers 500-1 and 500-2 within the consolidated NoC interconnect configuration 500. In this example implementation, NoC Layer 500-1 can be used for regular agent-to-agent data communication, and NoC Layer 500-2 can be used for performing and handling traffic relating to NoC function $F_1$, which is performed by NoC agent 502. In this manner, traffic of the NoC function $F_1$ can be isolated from the regular agent to agent communication traffic, even within the same NoC interconnect.

In one aspect, example implementation of FIG. 5(a) may be utilized to include functionality of the configuration master as the NoC function $F_1$ and have NoC Agent 502 facilitate the same functionality as the configuration master. In this example implementation, NoC agent 502 may be configured to transmit configuration master messages in the configuration master protocol (e.g., AXI4-Lite, APB/AHB protocol, etc.) that is subsequently converted to NoC protocol via a bridge 503. Communications sent to NoC agent 502 with respect to function $F_1$ can also be converted from NoC protocol to the configuration master protocol via the bridge 503. Bridge 503 can be used to translate messages from the protocol associated with function $F_1$ of the NoC agent 502 to protocol(s) of regular NoC agents such as 501-a, 501-b, and 501-c, and visa-versa. As the NoC 500 is configured to facilitate traffic for both the configuration master function as well as regular agent-to-agent communication, each NoC agent 501-a, 501-b, and 501-c can be configured to have a dedicated port or interface that is able to send or receive messages for communication from the configuration master function of the NoC Agent 502. Configuration traffic can also be isolated from the regular agent-to-agent communication of the NoC by use of dedicated virtual/physical channels for configuration master traffic. In another example implementation, port 1 of NoC agent 501-a can be configured to communicate with NoC agent 502 over a suitable protocol for function $F_1$, port 2 of NoC agent 501-a can be configured to communicate with NoC agent 502 over another suitable protocol for function $F_2$, and a port 3 of NoC agent 501-a can be configured to communicate with NoC agent 502 over a regular NoC protocol for data communication.

The example implementation of FIG. 5(b) can also be utilized when the NoC agent 502 is configured to perform functions of a configuration master. In such an implementation, the configuration master agent 502 can be configured to include other types of message besides the agent-to-agent communications. To facilitate communications by the configuration master agent 502, such communications can be isolated from the regular traffic of the NoC. In an example implementation, NoC Layer 500-2 can be constructed as a register bus layer and can be configured to handle all configuration messages. In such an implementation, the bridge 503 may also be omitted if the register bus layer is already configured to handle configuration messages using configuration master protocols.

Furthermore, a bridge may exist between the regular agents and the register bus NoC layer to convert the NoC protocol into the configuration interface protocol of the agents. The configuration protocol of agents may include AXI-lite or APB/AHB. In such cases, the NoC agents that are responsible for configuration and register access (acting as master) as well as the agents whose registers are being accessed and configured (acting as slave) may use a bridge to convert messages between the register bus protocol and the NoC protocol.

In example implementations, messages for NoC functions such as monitoring, debugging, JTAG, logic analyzer, and so on, can be implemented through the use of packetized messages. In such implementations, each message of the NoC function 512 can be packetized either by bridge 503 or by the NoC agent 502 itself, and sent over the NoC 500, wherein the NoC 500 is configured to facilitate the transmission of such packets to the destination NoC agent.

Figure 6A:
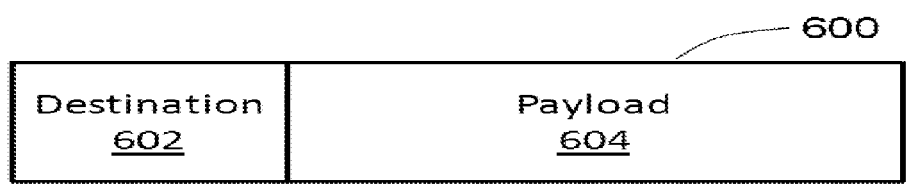
FIGS. 6(a) to 6(c) illustrate a NoC packet format and modifications thereof, in accordance with example implementations.

FIG. 6(a) illustrates an example NoC packet format 600. In an example embodiment, NoC packet 600 can include destination information 602 and payload information 604. In example implementations involving packetization, payload information 604 can be modified to include communications based on the NoC function $F_1$. In the example implementation of FIG. 6(b) involving the packetization of a configuration master message, payload information 650 can be configured to include the type of configuration (e.g. Load/Store 652), address information 654, and end data 656. In this example implementation, a system address map can be utilized by the NoC to determine where the end data 656 specified by the address information 654 should be sent. In the example implementation of FIG. 6(c), payload information 680 can be configured to include interrupt/exception 682, ID 682, and handler instructions 686.

Figure 6B:
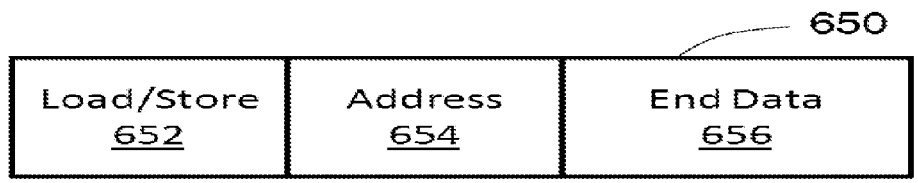
Figure 6C:
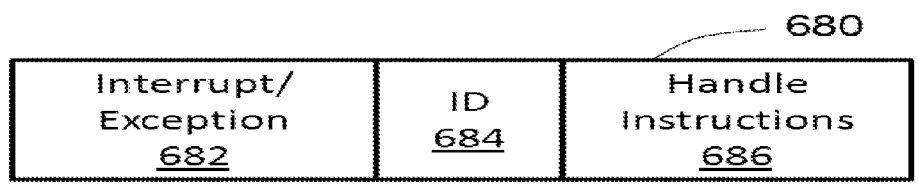

The examples of FIGS. 6(a) to 6(c) can be modified depending on the desired NoC function and the configuration and register access interface protocol being used. Other functions such as transporting interrupts and exceptions between various agents, monitor, debug, JTAG, logic analysis, and so forth can be implemented using similar modifications to the Destination/Payload format of the NoC packet based on the agents interface protocol. For each of these functions, the payload may include different fields depending on the implemented function. For example, when interrupts are being transported, the payload may contain the interrupt id, which may be determined by the bridge attached to the agent where interrupt was generated based on a global interrupt id assignment configured at the bridge.

Figure 7:
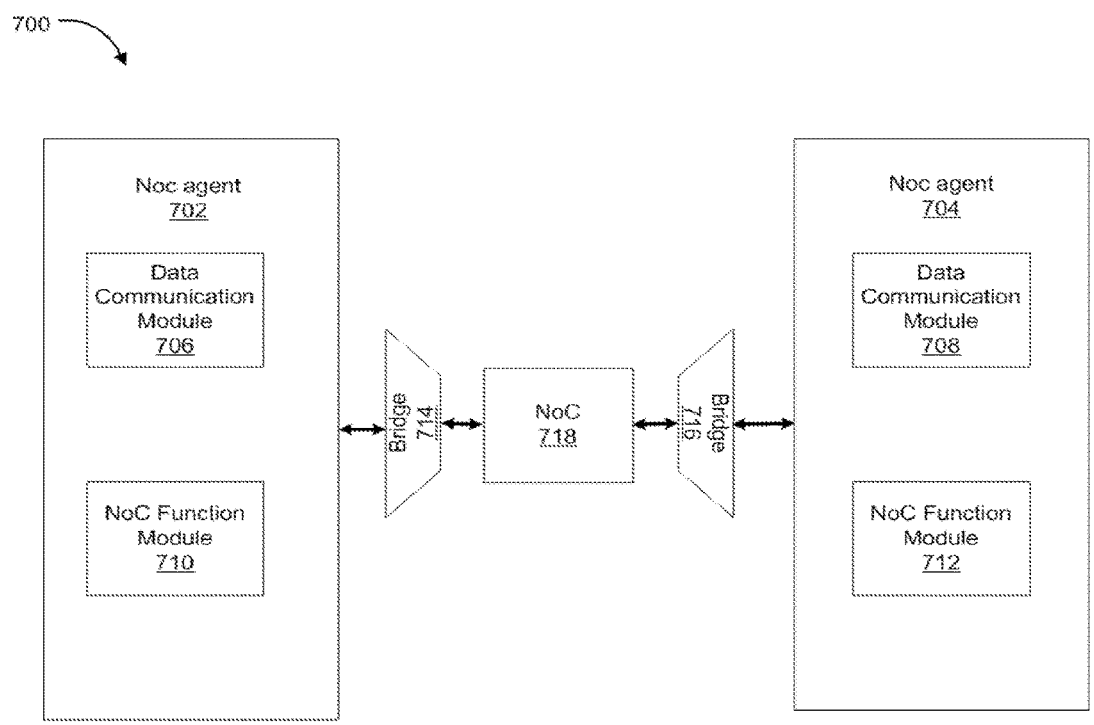
FIG. 7 illustrates an example view of two NoC agents, each performing both function as well as data communications, in accordance with an example implementation.

FIG. 7 illustrates an example view 700 of two NoC agents 702 and 704, each performing both function as well as data communications, in accordance with an example implementation. As can be seen, in this embodiment, NoC agent 702 can include a data communication module 706 and a NoC function module 710, and similarly, NoC agent 704 can include a data communication module 708 and a NoC function module 712, such that both the NoC agents 702/704 can perform both activities of enabling data communication between agents as well as performing one or a combination of NoC functions. NoC agents 702 and 704 can be coupled with the NoC interconnect architecture 718 of the instant invention through bridges 714 and 716 respectively.

Figure 8:
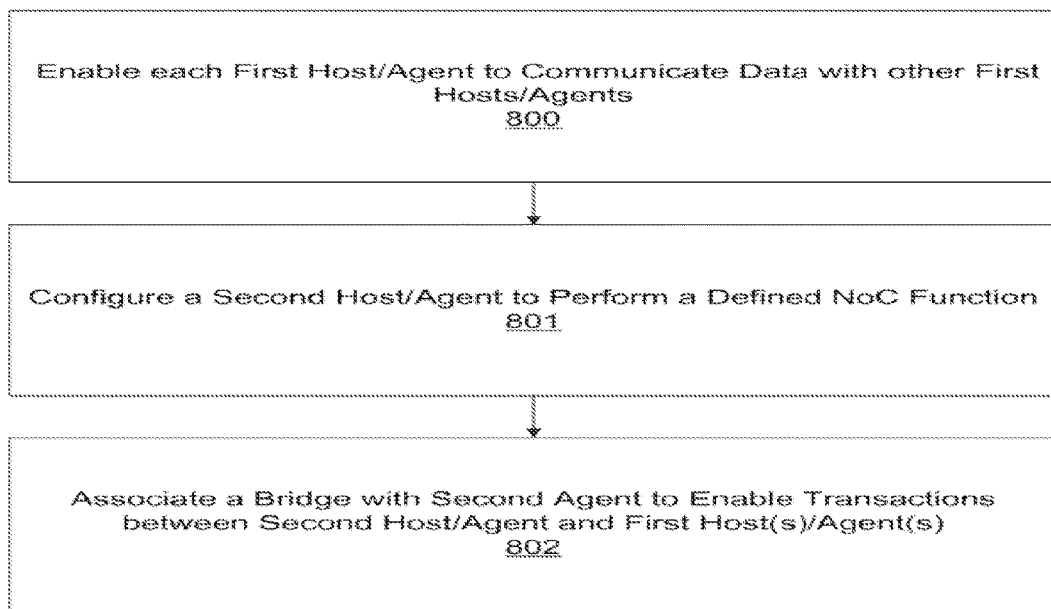
FIG. 8 illustrates an example flow diagram in accordance with an example implementation.

FIG. 8 is an example flow chart for enabling configuration of an NoC interconnect that enable performance of one or more NoC functions along with enabling data communication. At step 800, the NoC is configured to enable each of a plurality of first agents/hosts to communicate with other ones of the plurality of first agents. At step 801, a second agent can be configured to perform a defined NoC function, wherein the NoC function can include, but is not limited to, interrupt/exception handler function, a monitoring function, a debugging function, and a JTAG function. Such a second agent can either be configured at the same NoC level or at a different NoC level in a multi-layer architecture. At 802, a bridge is configured and associated with the second agent to packetize messages from the second agent to transmit to the plurality of first agents, and to translate messages from the plurality of first agents to the second agent.

According to one embodiment, the NoC function can be a register access and configuration management function that provides read and write access to one or more configuration registers of the plurality of first agents and to one or more interconnects of the plurality of first agents.

In another embodiment, the second NoC agent can be associated with an interconnect network comprising at least one separate set of one or more dedicated channels. In yet another embodiment, the one or more dedicated channels can be isolated from the one or more interconnects of the plurality of first agents, and the one or more dedicated channels can be configured to handle traffic between the second agent and the plurality of first agents.

In yet another embodiment, each of the one or more dedicated channels can be one of a virtual channel and a physical channel. In an alternate embodiment, the second agent can be selected from one of the plurality of first agents and is connected to the one or more interconnects of the plurality of first agents and to an interconnect network dedicated to the second agent. In another embodiment, the second agent can be associated with an interconnect network configured to facilitate traffic for the NoC function that is at least one of the interrupt/exception handling function and a register access and a configuration manager function; the monitoring function; the debugging function; and the JTAG function.

Figure 9:
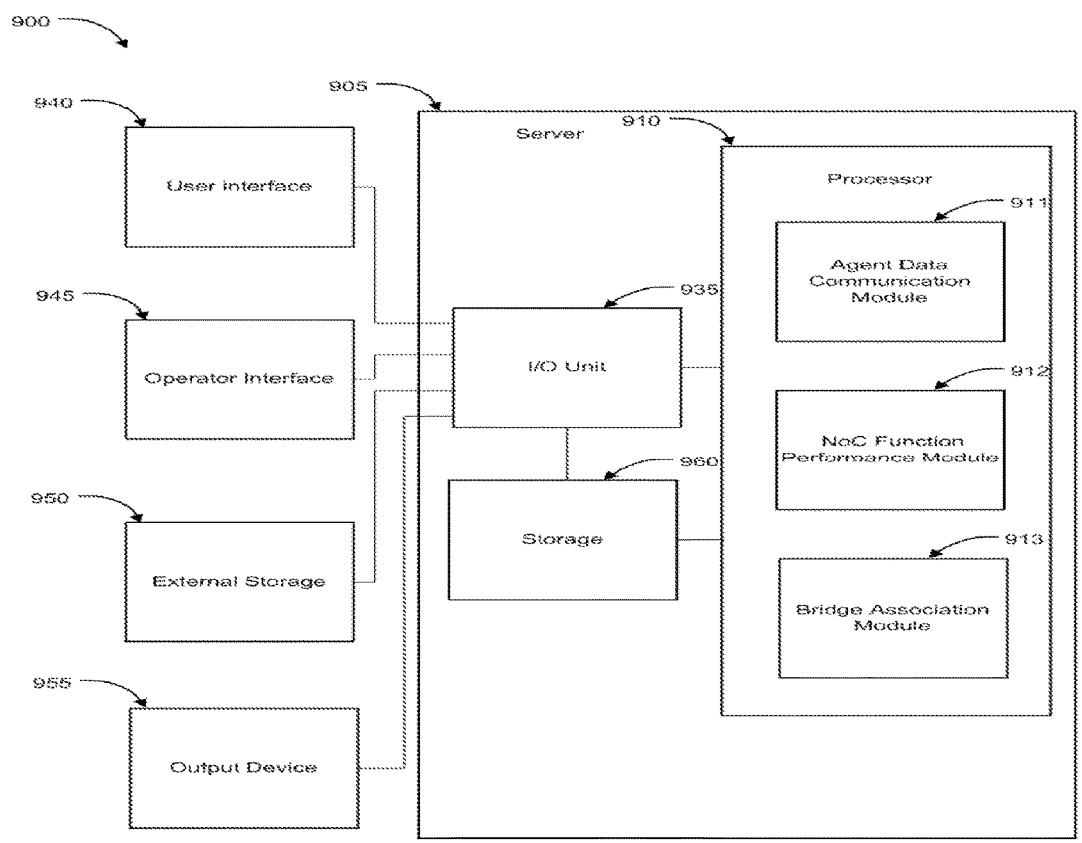
FIG. 9 illustrates a computer/server block diagram upon which the example implementations described herein may be implemented.

FIG. 9 illustrates an example computer system 900 on which example implementations may be implemented. Computer system 900 includes a server 905, which may involve an I/O unit 935, storage 960, and a processor 910 operable to execute one or more units as known to one of skill in the art. The term "computer-readable medium" as used herein refers to any medium that participates in providing instructions to processor 910 for execution, which may come in the form of computer readable storage mediums, such as, but not limited to optical disks, magnetic disks, read-only memories, random access memories, solid state devices and drives, or any other types of tangible media suitable for storing electronic information, or computer readable signal mediums, which can include media such as carrier waves. The I/O unit processes input from user interfaces 940 and operator interfaces 945 which may utilize input devices such as a keyboard, mouse, touch device, or verbal command.

The server 905 may also be connected to an external storage 950, which can contain removable storage such as a portable hard drive, optical media (CD or DVD), disk media or any other medium from which a computer can read executable code. The server may also be connected an output device 955, such as a display to output data and other information to a user, as well as request additional information from a user. The server 905 may be connected to the user interface 940, the operator interface 945, the external storage 950, and the output device 955 via wireless protocols, such as the 802.11 standards, Bluetooth® or cellular protocols, or via physical transmission media, such as cables or fiber optics. The output device 955 may therefore further act as an input device for interacting with a user.

The processor 910 may execute one or more modules including an agent data communication module 911, a NoC function performance module 912, and a bridge association module 913. In an embodiment, agent data communication module 911 can be configured to enable each of a plurality of first agents/hosts to communicate with other ones of the plurality of first agents. In another aspect, NoC function performance module 912 can be configured to enable a second agent to perform a defined NoC function such as interrupt/exception handler function, a monitoring function, a debugging function, and a JTAG function. In yet another aspect, bridge association module 913 can be configured to associate a bridge with the second agent to packetize messages from the second agent to transmit to the plurality of first agents, and to translate messages from the plurality of first agents to the second agent.

In some example implementations, the computer system 900 can be implemented in a computing environment such as a cloud. Such a computing environment can include the computer system 900 being implemented as or communicatively connected to one or more other devices by a network and also connected to one or more storage devices. Such devices can include movable user equipment (UE) (e.g., smartphones, devices in vehicles and other machines, devices carried by humans and animals, and the like), mobile devices (e.g., tablets, notebooks, laptops, personal computers, portable televisions, radios, and the like), and devices designed for stationary use (e.g., desktop computers, other computers, information kiosks, televisions with one or more processors embedded therein and/or coupled thereto, radios, and the like).

Furthermore, some portions of the detailed description are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the example implementations, the steps carried out require physical manipulations of tangible quantities for achieving a tangible result.

Moreover, other implementations of the present application will be apparent to those skilled in the art from consideration of the specification and practice of the example implementations disclosed herein. Various aspects and/or components of the described example implementations may be used singly or in any combination. It is intended that the specification and examples be considered as examples, with a true scope and spirit of the application being indicated by the following claims.

What is claimed is:

1. A Network on Chip (NoC), comprising:
a plurality of first agents, each of the plurality of first agents configured as a NoC host to communicate with other ones of the plurality of first agents through injection of messages into the NoC;
a second agent configured to perform a NoC function, the second agent being one of the plurality of the first agents and configured as a NoC host to communicate with other ones of the plurality of first agents through injection of messages into the NoC, the second agent connected to one or more interconnects of the plurality of the first agents and to an interconnect network dedicated to the second agent; and
a bridge connected to the second agent, the bridge configured to packetize messages from the second agent to transmit to the plurality of first agents, and to translate the messages from the plurality of first agents to the second agent.

2. The NoC of claim 1, wherein the NoC function is at least one of an interrupt/exception handler function, a monitoring function, a debugging function and a JTAG function.

3. The NoC of claim 2, wherein the second agent is associated with an interconnect network configured to facilitate traffic for the NoC function that is at least one of the interrupt/exception handling function and a register access and a configuration manager function; the monitoring function; the debugging function; and the JTAG function.

4. A non-transitory computer readable medium storing instructions for executing a process, the instructions comprising:

configuring each of a plurality of first agents as a Network on Chip (NoC) host to communicate with other ones of the plurality of first agents through injection of messages into the NoC;

configuring a second agent to perform a NoC function, the second agent being one of the plurality of the first agents and configured as a NoC host to communicate with other ones of the plurality of first agents through injection of messages into the NoC, the second agent connected to one or more interconnects of the plurality of the first agents and to an interconnect network dedicated to the second agent; and configuring a bridge connected to the second agent to packetize messages from the second agent to transmit to the plurality of first agents, and to translate the messages from the plurality of first agents to the second agent.

5. The non-transitory computer readable medium of claim 4, wherein the NoC function is at least one of an interrupt/exception handler function, a monitoring function, a debugging function and a JTAG function.

6. The non-transitory computer readable storage medium of claim 5, wherein the instructions further comprise associating the second agent with an interconnect network configured to facilitate traffic for the NoC function that is at least one of the interrupt/exception handling function and a register access and a configuration manager function; the monitoring function; the debugging function; and the JTAG function.

7. A method, comprising:

configuring each of a plurality of first agents as a Network on Chip (NoC) host to communicate with other ones of the plurality of first agents through injection of messages into the NoC;

configuring a second agent to perform a NoC function, the second agent being one of the plurality of the first agents and configured as a NoC host to communicate with other ones of the plurality of first agents through injection of messages into the NoC, the second agent connected to one or more interconnects of the plurality of the first agents and to an interconnect network dedicated to the second agent; and configuring a bridge connected to the second agent to packetize messages from the second agent to transmit to the plurality of first agents, and to translate the messages from the plurality of first agents to the second agent.

8. The method of claim 7, wherein the NoC function is at least one of an interrupt/exception handler function, a monitoring function, a debugging function and a JTAG function.

9. The method of claim 8, wherein the instructions further comprise associating the second agent with an interconnect network configured to facilitate traffic for the NoC function that is at least one of the interrupt/exception handling function and a register access and a configuration manager function; the monitoring function; the debugging function; and the JTAG function.

* * * * *